United States Patent [19]
Li

[11] Patent Number: 6,073,356
[45] Date of Patent: Jun. 13, 2000

[54] INCLINOMETER

[76] Inventor: Tianfu Li, 27165 Colleen Ct., Dearborn Hts, Mich. 48127

[21] Appl. No.: 09/074,754

[22] Filed: May 8, 1998

[51] Int. Cl.[7] ........................................................ G01C 9/16
[52] U.S. Cl. .................................. 33/391; 33/373; 33/377
[58] Field of Search .............................. 33/365, 368, 370, 33/371, 372, 373, 377, 391, 395, 396, 399, 402

[56] References Cited

U.S. PATENT DOCUMENTS

| | | | |
|---|---|---|---|
| 287,342 | 10/1883 | Van Alstyne | 33/377 |
| 636,843 | 11/1899 | Ramsey | 33/368 |
| 1,038,291 | 9/1912 | Cassell | 33/402 |
| 1,120,737 | 12/1914 | Nielsen | 33/368 |
| 1,449,669 | 3/1923 | Grossman | 33/368 |
| 1,506,689 | 8/1924 | Tallant | 33/368 |
| 1,597,960 | 8/1926 | Eltag | 33/368 |
| 3,707,772 | 1/1973 | Cotter | 33/395 |
| 4,096,638 | 6/1978 | Schimming | 33/396 |
| 5,398,422 | 3/1995 | Clarkson | 33/365 |

*Primary Examiner*—G. Bradley Bennett
*Attorney, Agent, or Firm*—Tianfu Li

[57] ABSTRACT

An inclinometer comprising a housing having transparent front plate and flat bottom, a gravitated rotational protractor having angle graduation printed on the front panel, a pendulum swing needle and protractor rotation locking device. By controlling the locking device, the protractor can be released to rotate freely and can be locked in a position. When the protracted is unlocked, the pendulum swing needle and the gravitated rotational protractor will always rotate to the relatively same position (the needle point to "0" degree angle). Then the locking device can lock the protractor to prevent rotation and the needle continues to rotate to measure the angle to which the inclinometer has been tilted.

14 Claims, 5 Drawing Sheets

INCLINOMETER

BACKGROUND OF THE INVENTION

1. Field of invention

This invention is related generally to an angle measuring instrument, and more particularly to a inclinometer of the type having a casing, a scale disposed within the casing and a locking device.

2. Description of prior art

Inclinometer can measure the angle between an object and a vertical line in the vertical plane. When using the inclinometer measuring the angle between two objects in a vertical plane, most of the time you have to measure the angles between the objects and vertical line, then calculate the two angle to get the angle between the two objects. It is very inconvenient to use that method. U.S. Pat. No. 4,656,752 discloses a precise-reading angular level that includes a casing, and a rotational protractor rotationally mounted in the casing, a plumbing swing angle indicator pivotally mounted in the casing. By using this device, the user can measure the angle between two objects with one measurement, but still has to manually adjust the inclinometer to zero before making the measurement. That method is inconvenient and may not be accurate due to the error made by manually adjusting it to zero.

OBJECT AND ADVANTAGES

It is an objective of the present invention to provide an improved inclinometer to measure the angle between the object and the vertical or horizontal line.

It is another objective of the present invention to provide an improved inclinometer to measure the angle between two objects.

It is another objective of the present invention to provide an improved inclinometer to measure the angle between two objects without calculation.

It is another objective of the present invention to provide that automatically adjust to zero.

It is another objective of the present invention to provide an improved inclinometer that is easy to use and more accurate to measure the angle between two objects.

It is another objective of the present invention to provide an improved inclinometer that is inexpensive easy to manufacture with.

SUMMARY OF THE INVENTION

The objective of the present invention is to provide an inclinometer which includes a casing, a gravitated rotational protractor, a pendulum swing angle indicator, a protractor rotation locking device and an object holding strip. By controlling the locking device, the protractor can be released to rotate freely, the pendulum swing needle and the gravitated rotational protractor will always rotate to the relatively same position (the needle point to "0" degree angle ). Then the locking device can lock the protractor at a fixed position, the needle continuing to rotate to measure the angle to which the inclinometer has been tilted.

DESCRIPTION OF THE PREFERRED EMBODIMENT

Figure 2:
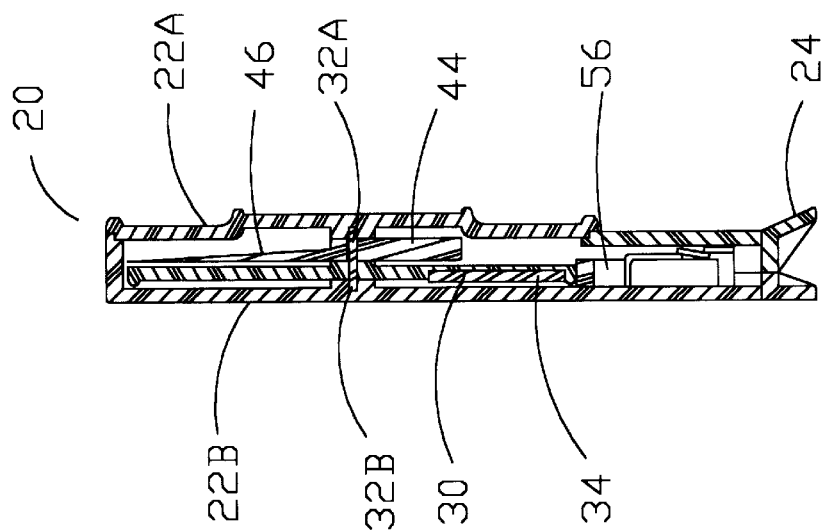
FIG. 2 is a cross section of the present invention taken at plane 2—2 of FIG. 1.
Figure 1:
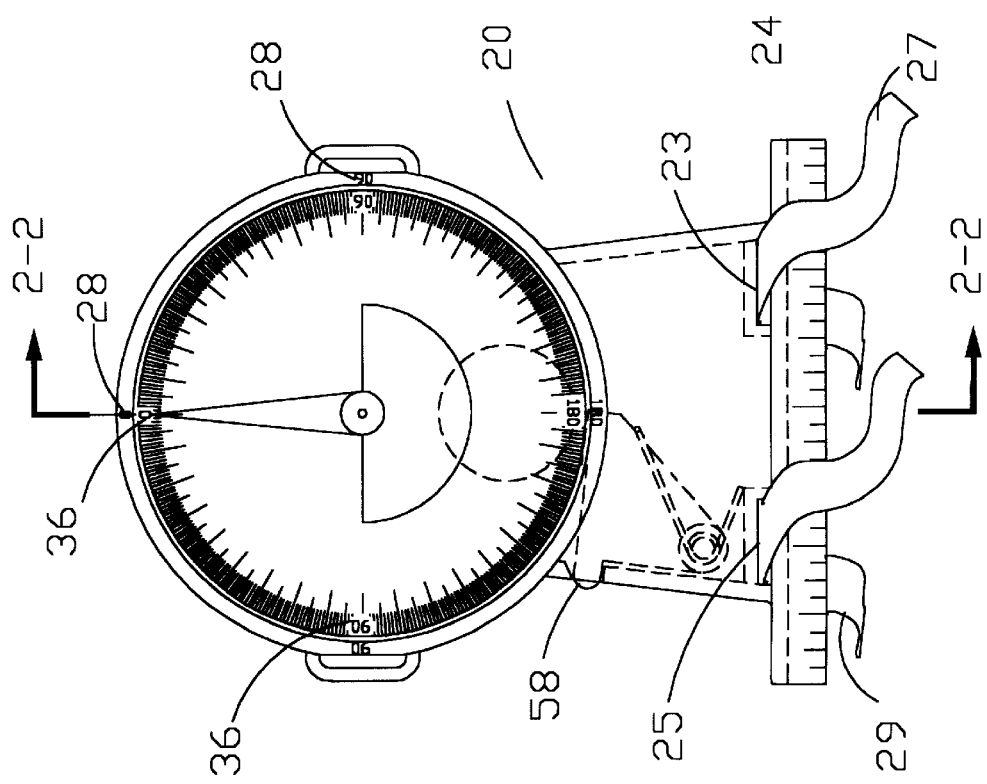
FIG. 1 is a front view of the present invention.

As shown in FIGS. 1–6, the present invention includes a casing, 20, which includes a front transparent plate 22a and a rear plate 22b, the front plate having am angular graduation 28 distributed both rightward and leftward from a central zero graduation on top, a protractor 30 rotationally mounted in the casing 20 at axis 32, a pendulum indicator or needle 40 rotationally mounted on axis 32 of the protractor 30, and a locking device 50 pivotally mounted in the casing 20 through axis 52.

Figure 5:
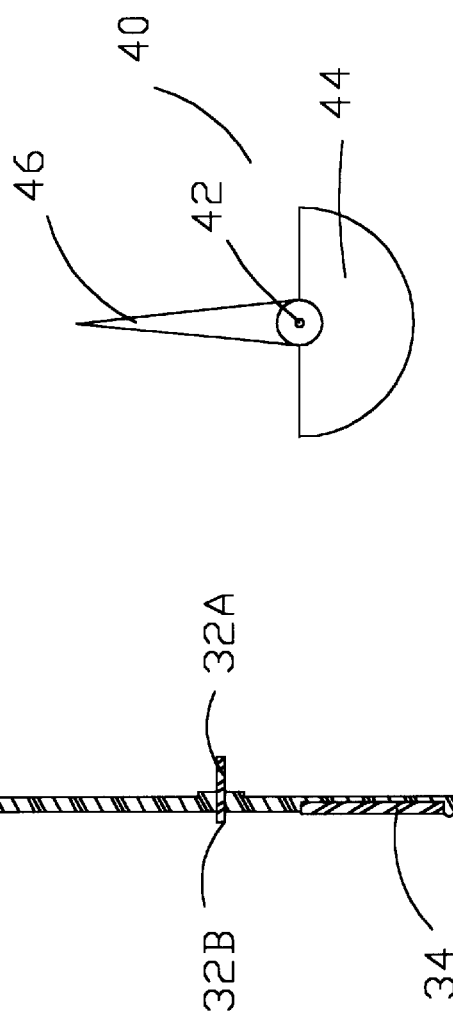
FIG. 5 is a front view of pendulum swing angle indicator.
Figure 4:
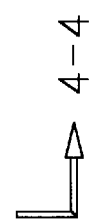
FIG. 4 is a cross section of the protractor taken at plane 4—4 of FIG. 3.
Figure 3:
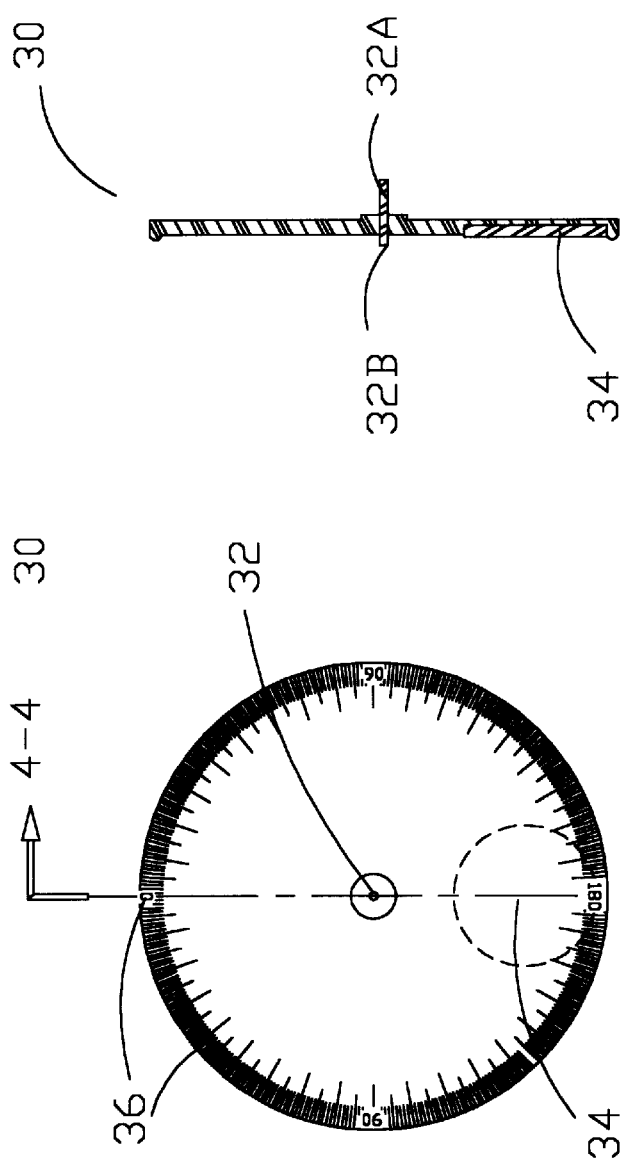
FIG. 3 is an illustration showing the gravitated rotational protractor of the present invention.
Figure 6:
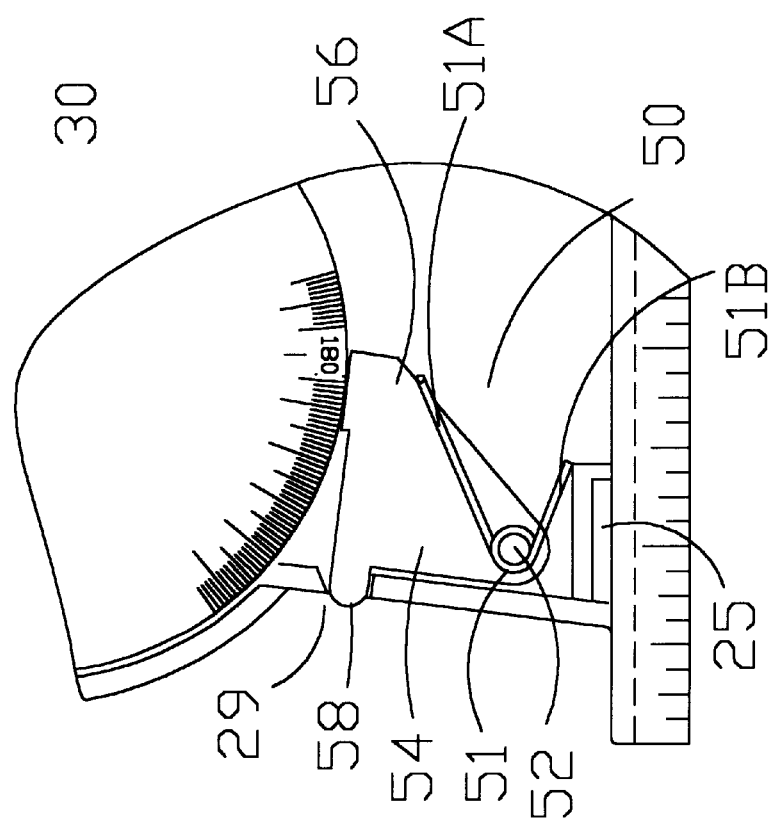
FIG. 6 is the front view of one embodiment of the protractor rotation locking device, the locking device located at a lateral edge of the protractor.

The front plate 22a and rear plate 22b of the casing 20 form the flat bottom surface 24 having two slots, 23 at the left and 25 at the right. Two strips 27 and 29 pass through the corresponding slots. The front plate 22a is formed of transparent material. The rotational protractor 30, shown in FIGS. 3 and 4, made of light weight material such as plastic, has an axis 32 at the center. A weighted disc 34 is embedded on the lower portion of the protractor 30. An angle graduation 36 distributed both rightward and leftward from the central zero graduation coincides with indicator needle 46 while both the protractor and indicator are gravitationally pendant. The pendulum swing angle indicator 40 as shown in FIG. 5, having weight 44 located at one end and needle 46 at the opposite end, is pivotally mounted on the front axis 32a of the protractor 30 through the hole 42 between the weight 44 and needle 46. The locking device as shown in FIG. 6 includes a "V" shaped lever pivotally mounted in the casing at axis 52 located at the medial point of the lever, the lever having on either side of axis 52 one arm 56 extending to the lateral edge of the protractor 30 and another arm 54 having a button formed at the end of the arm 54, the button 58 protruding out of the casing 20 through the window 29 at a lateral side of the casing. A helical spring 51, supported at the axis 52, has one arm 51a mounted on the lever and another arm 51b mounted on the casing to prevent the lever from rotating.

Figure 7:
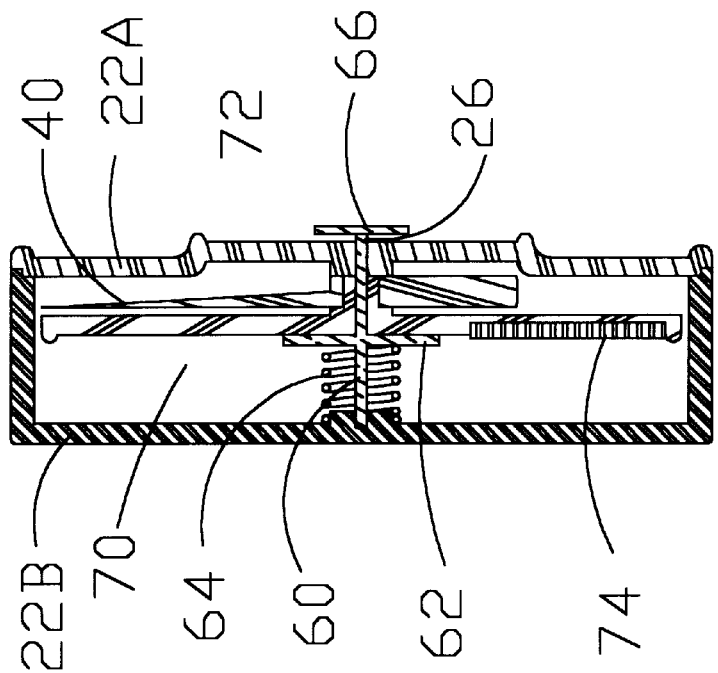
FIG. 7 is a cross section of another embodiment of rotational locking device taken at plane 2—2 of FIG. 1, the locking device located at a central position.

FIG. 7 shows another embodiment of the present invention. A locking device located at the center axis includes a casing having a hole 26 at the center of the front plate 22a, a weighted rotational protractor 70 rotatably mounted on axis 60 in the casing 20, a pendulum swing angle indicator 40 rotatably mounted on a central forward protrusion 72 of the protractor 70, a locking spring 64 placed around the axis 60 located between the rear plate 22b of the casing and a protrusion 62. The axis 60 has control disc 66 located at its front end, the disc having an axial extension spring block protrusion located at approximately middle length of the axis. The disc extension passes through the medial hole 26 of the front plate 22a of the casing 20 and is pivotably mounted on the rear plate 22b. The rotational protractor 70 has a pivot hole 72 at the center to allow the disc extension to pass through. A weight 74 is located at the lower portion of the protractor.

Figure 9:
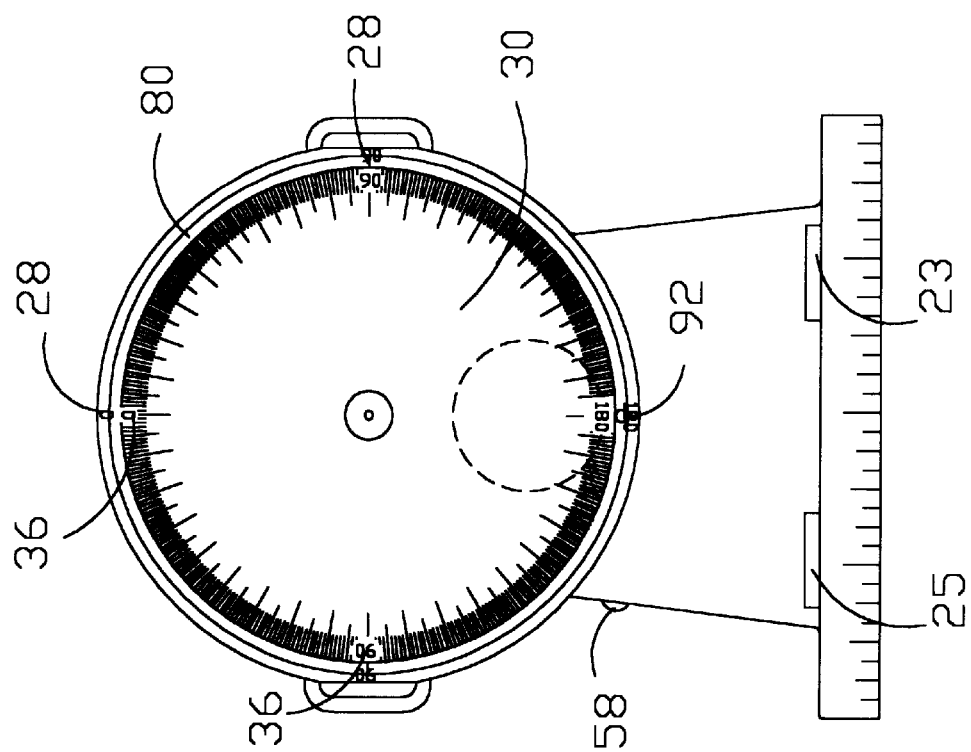
FIG. 9 is a front view of another embodiment of present invention, wherein the angle indicator is a colored ball.
Figure 8:
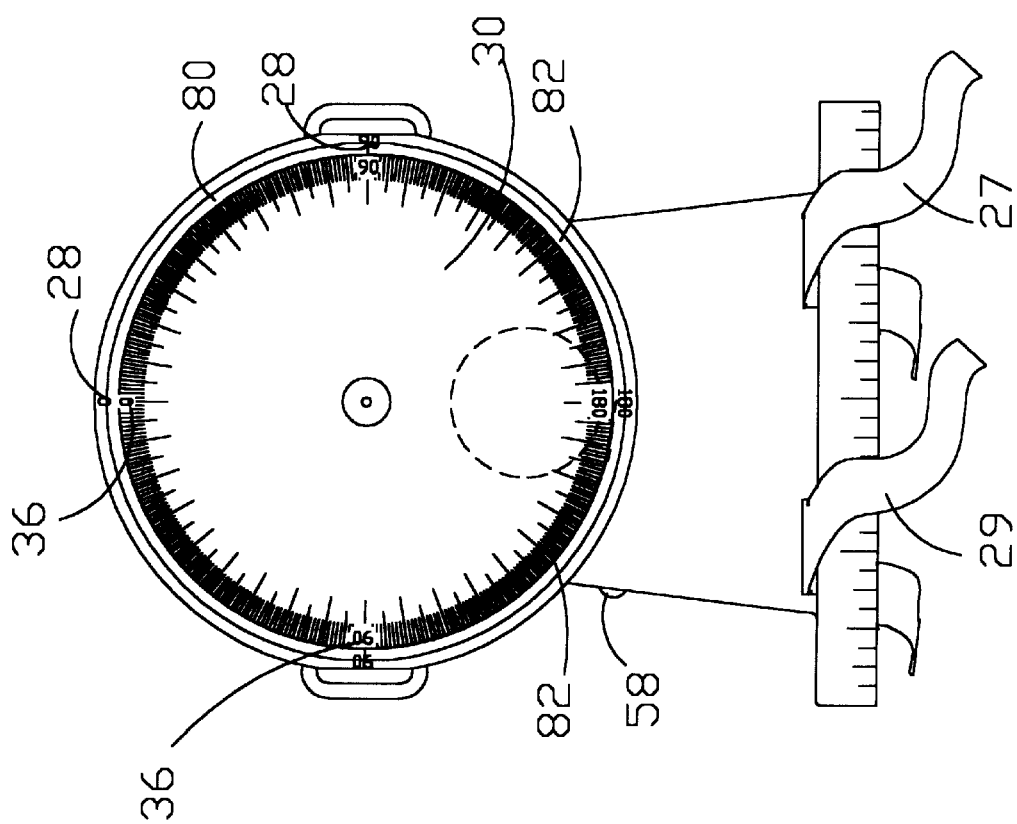
FIG. 8 is a front view of another embodiment of the present invention, using colored fluid as the angle indicator.

FIGS. 8 and 9 show two other embodiments of the invention. A tube 80, supported on the front plate 22a partially surrounds the periphery of the protractor 30. When half of the tubing is filled with colored fluid 82, the surface line of the fluid 82 indicates the angular reading. When a colored ball 92 is placed in the empty tubing, the lowest point on the ball indicates the angle reading.

Figure 10:
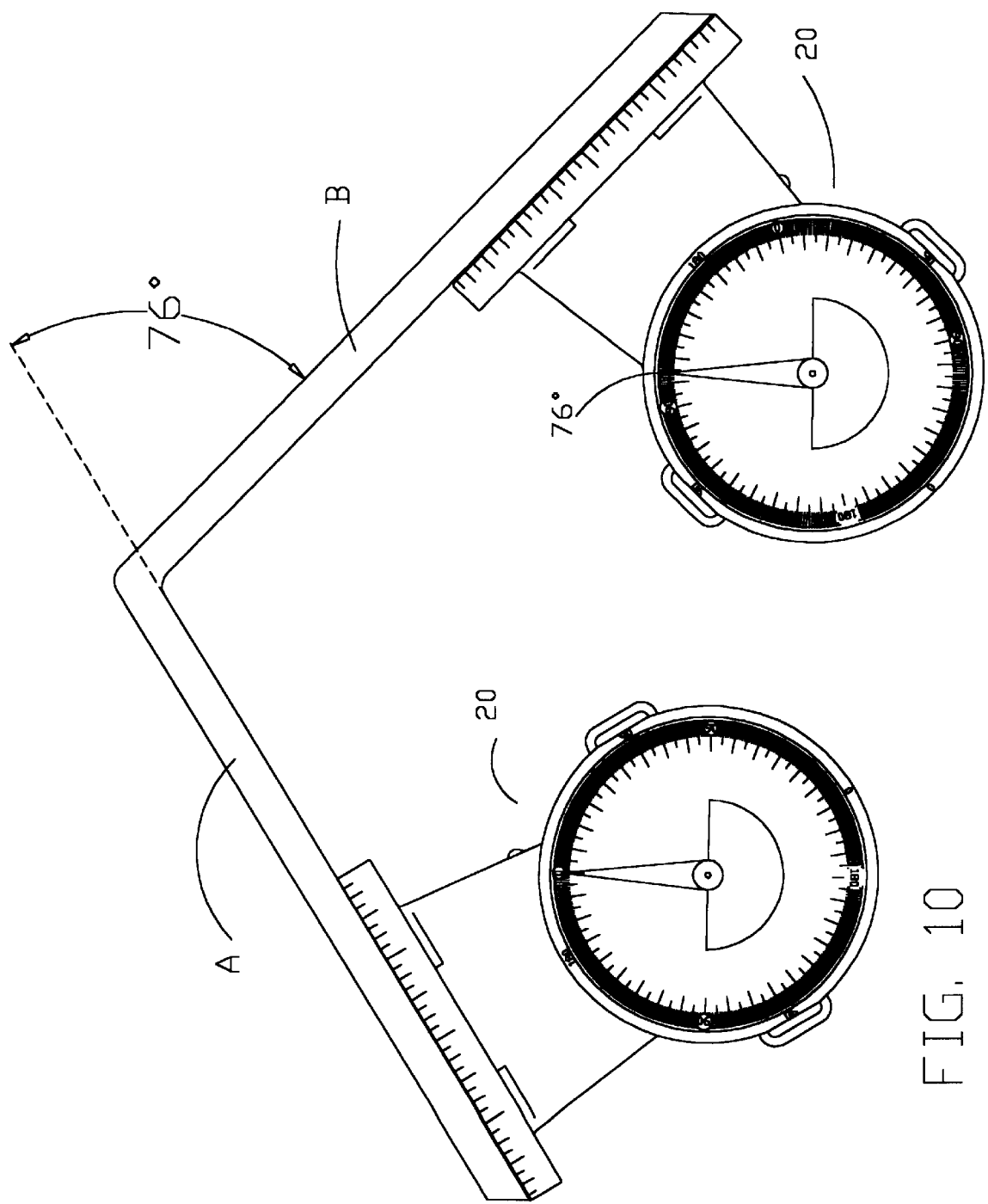
FIG. 10 shows an application when using the present invention for measuring the inclination angle between two objects.

Referring now to FIG. 10, for a description of the use of this invention to measure the inclination angle between the surfaces of object A and object B. The bottom surface 24 is placed on the object A and may be fixed in position there by strips 27, 29. Depressing the button 58 or disc 66 frees the protractor 30 or 70 to freely rotate under the effect of gravity on the angle indicator needle 40 or colored fluid 82 or the colored ball 92. In this way the inclinometer adjusts to zero. Then by releasing the push button 58 or control disc 66, the protractor 30 or 70 will be locked in a fixed position. Next, the inclinometer bottom surface 24 is moved onto object B. The indicator needle 40, colored fluid 82, or colored ball 92 will rotate under the effect of gravity to show the inclination angle between object A and B.

What is claimed is:

1. A device for indicating the angular disposition of a first surface relative to a second surface, comprising:
   a casing having a transparent front plate and a mounting surface adapted to contact the first and second surfaces;
   a protractor supported on the casing for rotation about an axis, having angular gradations marked on a front surface thereof, the front surface facing said front plate, the protractor carrying a first weight offset from said axis;
   an indicator needle located adjacent the front surface, pivotably supported for rotation about the axis, the indicator needle carrying a second weight offset from said axis; and
   locking means for alternately holding the pendulum against rotation and for releasing the pendulum to rotate freely.

2. The device of claim 1 wherein the protractor is in the form of a disc.

3. The device of claim 1 wherein the first weight has a center of gravity located on the protractor coincident with one of said angular gradations corresponding to zero degrees and one hundred and eighty degrees.

4. The device of claim 1 wherein the front plate includes a centrally located zero angle gradation marked on a front surface thereof, and angle gradations distributed in opposite angular directions from said zero angle gradation.

5. The device of claim 1 wherein the casing includes slots, and further comprising strips adapted to pass through the slots for fixing the device to the first and second surfaces.

6. The device of claim 1 wherein the mounting surface is substantially flat.

7. The device of claim 1 wherein the an indicator needle includes an indicator extending radially from said axis and the second weight is located substantially diametrically opposite from the indicator.

8. The device of claim 1 wherein the locking means comprises a lever supported on a pivotably mounting, the lever having:
   a first arm extending away from the mounting, adapted to pivot into and out of engagement with the protractor;
   a spring urging the first lever arm into engagement with the protractor; and
   a second arm connected to the first arm and extending from the mounting, the spring urging a portion of the second arm to extend through the casing and to permit the second arm to move the first arm out of engagement with the protractor.

9. The device of claim 1 further comprising a sealed tube supported on an exterior surface of the casing adjacent the front plate, arcuately extending partially around a periphery of the protractor.

10. The device of claim 9 wherein said tube is filled with a colored fluid.

11. The device of claim 9 further comprising a spherical ball located in the tube, the ball adapted to move freely within the tube.

12. A device for indicating the angular disposition of a first surface relative to a second surface, comprising:
   a casing having a front plate, a rear plate, and a mounting surface adapted to contact the first and second surfaces;
   a protractor rotatably Supported on the pin for rotation about an axis, having angular gradations marked on a front surface thereof, the front surface facing said front plate, the protractor carrying a first weight offset from said axis;
   an indicator needle located adjacent the front surface, pivotably supported for rotation on the pin, the indicator needle carrying a second weight offset from said axis, the protractor and indicator needle located within the casing;
   a pin located on said axis, supported on the front plate and rear plate, the pin carrying a button located adjacent the front plate outside the casing, and a disc located adjacent the protractor; and
   a spring urging the disc into engagement with the protractor, whereby the protractor is held against rotation, the spring permitting the disc to disengage the protractor and to rotate freely in response to depressing the button.

13. The device of claim 12 wherein the first weight has a center of gravity located on the protractor coincident with one of said angular gradations corresponding to zero degrees and one hundred and eighty degrees.

14. The device of claim 12 wherein the spring is disposed coaxially with the pin, and the spring is a compression spring located between an inner surface of the rear plate and the disc.

* * * * *